Dec. 21, 1965  I. E. ROSMAN  3,224,678
MODULAR THRUST CHAMBER
Filed Oct. 4, 1962  2 Sheets-Sheet 1
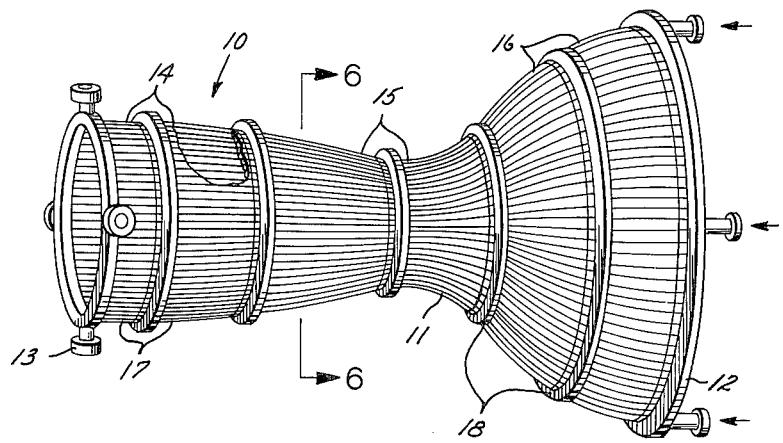
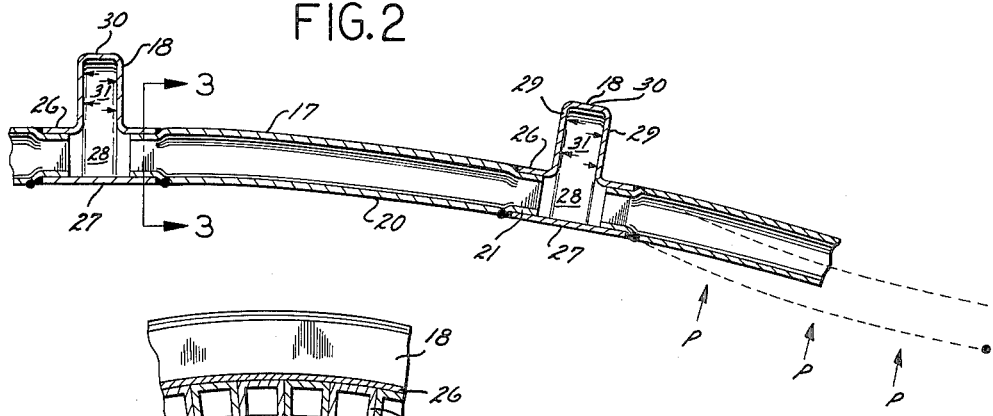
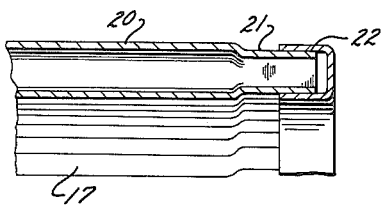
INVENTOR.
IRWIN E. ROSMAN
BY
R. E. Geauque
ATTORNEY Dec. 21, 1965     I. E. ROSMAN     3,224,678
MODULAR THRUST CHAMBER Filed Oct. 4, 1962            2 Sheets-Sheet 2

INVENTOR.
IRWIN E. ROSMAN
BY
R. E. Geauque
ATTORNEY

United States Patent Office 3,224,678
Patented Dec. 21, 1965

3,224,678
MODULAR THRUST CHAMBER
Irwin E. Rosman, Woodland Hills, Calif., assignor to The Marquardt Corporation, Van Nuys, Calif., a corporation of California
Filed Oct. 4, 1962, Ser. No. 228,420
10 Claims. (Cl. 239—127.1)

This invention relates to modular thrust chambers and more particularly to actively cooled tubular structures such as rocket thrust chambers, ram jet components, air frame structures and other streamlined structures which may be subjected to aerodynamic or combustion temperatures many times higher than their melting point and to a method of fabricating such structures.

Conventional practice in the design of regeneratively cooled thrust chambers utilizes the technique of tube bundling wherein the flow passage shell for the combustion gas is made of a plurality of single lengths of tubes which are joined together to form an encompassing sidewall. The individual lengths of tubes are identical and are of variable cross-section along their length to correspond to the cooling requirements along the axial length of the chamber. The individual lengths of tubes are also of a curvilinear shape to form the required convergent-divergent lines of the chamber throat and exit. These changes in cross-sectional area and shape of the individual lengths of tubes are exceedingly difficult to fabricate, requiring rather expensive tooling to hydraulically expand the individual tubes near their ends with an accurate tolerance.

It is also rather difficult to maintain the individual lengths of tubes of uniform straightness so that a uniform surface will be presented by the individual tubes for the peripheral wall of the chamber. External rings are affixed axially along the tubes to hold the bundle together while the individual tubes are being brazed together and to serve the function of absorbing hoop stresses induced by the chamber pressure and also to impart cylindrical stiffness to the chamber. The tubes are brazed together in a furnace which must have sufficient capacity to accommodate the entire chamber because it must be brazed as a unit. Once the entire tube bundle or chamber has been brazed, if leakage occurs which cannot be patched satisfactorily, the entire assembly would be scrapped.

The disadvantage in employing external rings to absorb hoop stresses resides in the fact that the tubes serve to distribute pressure loads to the rings. Because the rings and tubes are of different temperatures, thermal stresses are induced and also, because the rings are attached to the tube bundles, built in fixity of the tubes under thermal deflection results, thereby causing additional thermal stresses in the tubes. Internal pressure within the combustion chamber acting upon the tubes creates moments about the points of attachment of the rings which cause beam bending, thereby increasing the total induced stresses in the tubes. Since the rings restrain the tubes against their natural tendency to curl when exposed to pressure and heat, stresses build up until the hot-wall surfaces of tubes buckle and cracks develop.

In view of the foregoing factors and conditions characteristic of regeneratively cooled thrust chambers employing tube bundles comprising individual lengths of tubes joined together with solid rings, it is a primary object of the present invention to provide a new and improved actively cooled, tubular structure not subject to the disadvantages enumerated above and employing modular sections joined together with flexible, hollow rings which cooperate with other means to minimize thermal stress within the tubes and prevent buckling and cracking of the tubes and to provide a method of fabricating such a structure.

Another object of the invention is to provide a method of and means for joining together modular lengths of tube bundles into a desired structural shape.

A further object of the invention is to provide a method of and means for permitting thermal deflection of tubes employed in tube bundles with no appreciable end restraint.

A still further object of the invention is to provide modular tube bundle sections for an actively cooled tubular structure which may be individually furnace-brazed and then joined together outside the furnace to form complete structural units to simplify manufacturing, check individual section reliability and reduce scrap losses of large assemblies.

Another object of the invention is to join modular sections of tube bundles together with flexible, hollow rings which are cooled in the same circuit as the individual tubes to minimize tube-to-ring thermal stresses.

Yet another object of the invention is to join modular sections of tube bundles together with flexible, hollow rings in such a manner that fulcrum points are formed and by making the rings of such size that a lever arm acting on the inner wall thereof will induce a moment in the individual tubes which will offset that caused by the chamber pressure acting against the inner wall formed by the tubes.

These and other more specific objects will appear upon reading the following specification and claims and upon considering in connection therewith the attached drawings to which they relate.

Referring now to the drawings in which a presently preferred embodiment of the invention is illustrated:

FIGURE 1 is a view in perspective of a modular thrust chamber of the invention;

FIGURE 2 is a partial, longitudinal cross-sectional view of an individual modular section of tubing showing the means by which other sections are connected thereto;

FIGURE 3 is a partial, cross-sectional view taken along line 3—3 of FIGURE 2;

FIGURE 4 is a partial, cross-sectional view of a segment of the tube bundle of FIGURE 2 showing an end cap in position thereon for testing prior to connecting the section to other sections;

FIGURE 5 is a cross-sectional view of a detail of construction showing modified means for connecting modular sections together;

Figure 6:
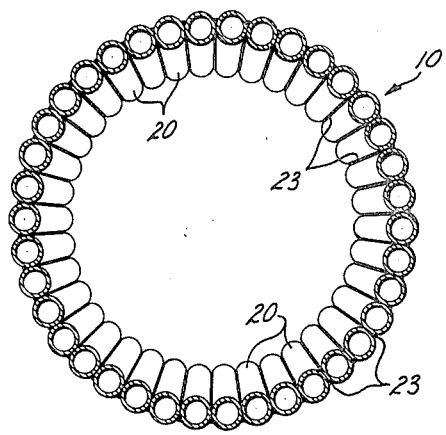
FIGURE 6 is a transverse, cross-sectional view taken along line 6—6 of FIGURE 1.

Referring again to the drawings, the regeneratively cooled tubular structure constituting the present invention, generally designated 10, includes a flow passage shell 11, a coolant inlet manifold 12 and coolant exit manifold 13.

The flow passage shell 11 includes an upper chamber section 14 of fairly uniform diameter, a throat section 15 of minimum diameter, and an exit section 16 of maximum diameter. The various transitions from uniform diameter, to minimum diameter, and thence, to the maximum diameter are accomplished by joining individual modules of tube bundles 17 together with inner-modular rings 18.

Figure 7:
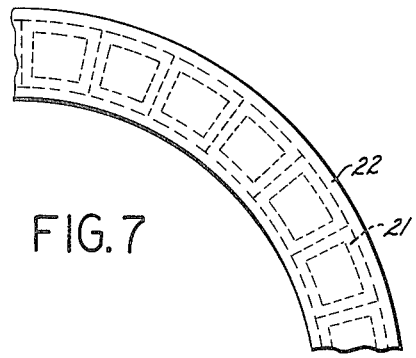
FIGURE 7 is an end view of FIGURE 4.
Figure 11:
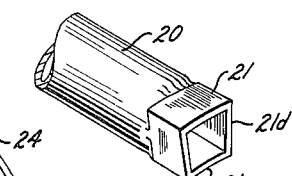
FIGURE 11 is a view in perspective of a tube end which is specially formed for joining to an inner-modular connecting ring employed in a chamber of the invention.

Each tube bundle 17 comprises a plurality of individual tubes 20 having modified rectangular end portions 21. As best seen in FIGURE 11, each end portion 21 includes parallel, arcuate upper and lower walls 21c and radial sidewalls 21d forming a segmented, annular tube end. The individual tubes 20 are placed together in a cylindrical bundle which is held together by welding or brazing an annular closure cap 22 to the exposed ends of the end portions 21, as shown in FIGURES 4 and 7. The annular end caps 22 permit testing the individual tubes 20 and will hold the tube bundle 17 together while it is placed in a furnace and brazed to join the tubes 20 together along their longitudinal lengths, thereby forming an impervious, encompassing outer wall 23 of tubes, as shown in FIGURE 6. After a tube bundle 17 has been brazed in a furnace, annular plate or shell-type end closures 24 may be joined to the end caps 22 so that the chamber formed by the tube bundle 17 may be pressurized through a fitting 25 to test the wall 23 for leakage between the tubes 20. The end caps 22 and closures 24 may then be removed by severing the end portions 21 immediately adjacent the inner edges of the end caps 22.

A plurality of tube bundles 17 are joined together with the inner-modular rings 18 by brazing the lip portions 26 of the rings 18 to the end portions 21 of the tubes which remain after the caps 22 are severed therefrom. Each ring 18 encompasses the outer periphery of the end portions 21 of the tube bundle. The inner periphery of the end portions 21 of adjacent tube bundles 17 are joined together by means of a circular shell 27 forming an annular channel 28, as shown in FIGURE 2.

In addition to the lips 26, each ring 18 includes upstanding sidewalls 29 and a closed top wall 30 forming an annular channel 31 with the channel 28. Coolant flowing in the tube bundle 17 will then cool the connector ring 18 thereby virtually eliminating differential expansion between the ring 18 and the tube bundle 17. The pressure of the coolant fluid against the sidewall 29, represented by the arrows in channel 31 of the connector ring 18, induces a bending moment in the tube 20 opposite that caused by the chamber pressure, as represented by the arrows P in FIGURE 2. It will be obvious that the lever arm of the bending moment created by the pressure in channel 31 will depend on the height of the walls 29 which have sufficient flexibility so that they may be deflected (as indicated by broken lines in FIGURE 2), thereby tending to deflect the tube 20 (as also indicated in broken lines in FIGURE 2). It is to be noted that the tube 20 will then be free to pivot about the brazed point of connection between the shell 27 and the tube 20 which acts as a fulcrum point. This is an important feature of the invention because it provides means for minimizing stresses which would be set up in the tubes 20 if they were of continuous length through a solid ring and rigidly connected thereto.

Referring now to FIGURE 5, a modified connection is shown for connecting the individual tube bundles 17 together. A connector ring 18 and circular shell 33 are employed, as before; however, an annular sleeve 34 is then brazed into suitable notches cut into the ends of the end portions 21 so that the sleeve 34 takes the axial load off the hot wall of the individual tubes 20 and keeps the tubes from pulling apart. The sleeve 34 then becomes a fulcrum about which the moment arms may work. The convolution 33a in shell 33 permits axial deflection in this case.

Figure 10:
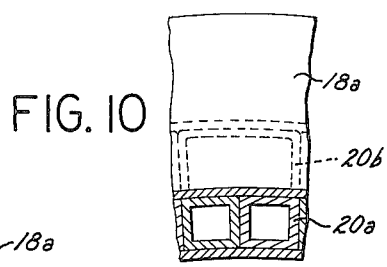
FIGURE 10 is a partial cross-sectional view taken along line 10—10 of FIGURE 9.
Figure 9:
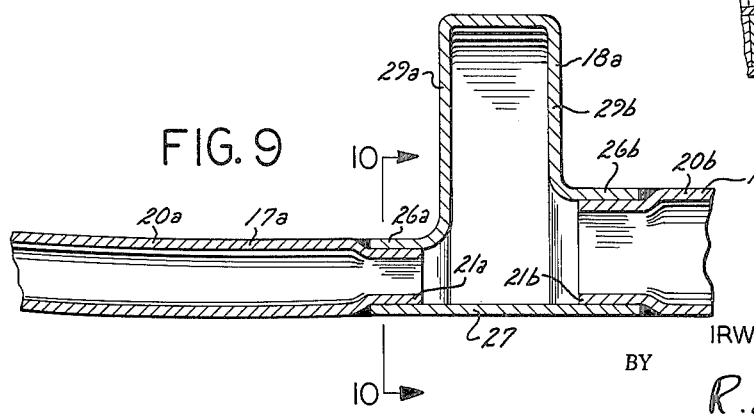
FIGURE 9 is a partial cross-sectional view of a portion of a chamber showing a module having tubes of one size joined to a module having tubes of a larger size.

Referring now to FIGURES 9 and 10, a modified connector ring 18a is shown which has one sidewall 29a which is longer than the other sidewall 29b and permits joining a first tube bundle 17a, employing small tubes 20a, to a second tube bundle 17b, employing large tubes 20b. A shell 27 is brazed to the inner peripheries of the ends 21a and 21b and lips 26a and 26b of ring 18a are brazed to the outer peripheries. This makes a convenient transition section for use at the throat of the shell 11 where it is desirable to decrease the diameter of the tubes employed.

An example of fabricating a thrust chamber in accordance with the method of the invention comprises the steps of:

(A) Inserting the ends 21 of the end of a plurality of tubes 20 into a first annular cap-ring 22 to form a cylindrical chamber (FIG. 4).

(B) Installing a second ring 22 on the ends 21 of the other end of the tubes 20.

(C) Tack welding or otherwise temporarily joining the first and second rings 22 to the ends 21.

(D) Applying a brazing alloy between the tubes 20 along their axial lengths around the outer periphery of the chamber.

(E) Fusing the brazing alloy to the tubes 20, the ends 21 and the rings 22 to form an impervious chamber wall.

(F) Testing the individual tubes for leakage.

Figure 8:
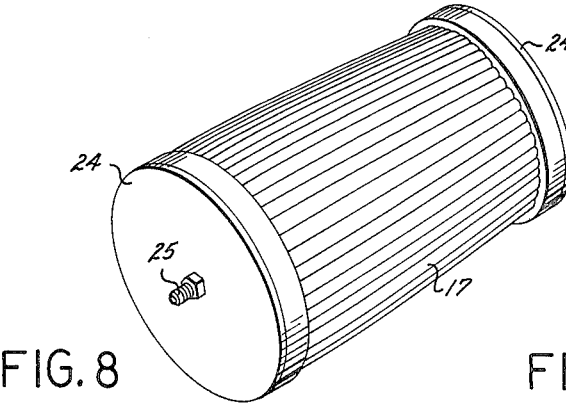
FIGURE 8 is a view in perspective of a section of the chamber of FIGURE 1 with end caps attached thereto.

(G) Sealing the open annulus formed by each cap-ring 22 at the ends of the chamber by inserting end closures 24 (FIG. 8).

(H) Pressurizing the chamber to test it for leakage.

(I) Severing the rings 22 from the ends of the tubes leaving a portion of the ends 21 for subsequent use.

(J) Joining a plurality of chambers thus formed together by induction brazing the lips 26 of a hollow ring 18 to the remaining portions of the ends 21 about the outer peripheral wall of the chamber and a shell 27 to the ends 21 about the inner peripheral wall of the chamber.

While the particular modular thrust chamber and method herein shown and described in detail are fully capable of attaining the objects and providing the advantages hereinbefore stated, it is to be understood that they are merely illustrative of the presently preferred embodiments of the invention and that no limitations are intended to the steps of the method described or to the details of construction or design herein shown other than as defined in the appended claims.

I claim:

1. A regeneratively cooled, tubular chamber having an encompassing wall comprising:
   a first modular tube bundle having individual tubes rigidly affixed together to form a first portion of the encompassing wall of said chamber;
   a second modular tube bundle having a plurality of tubes rigidly affixed together to form a second portion of the encompassing wall of said chamber;
   a hollow, annular ring connecting an end of each of said modules together in fluid communication; and
   means for supplying a coolant to said modules and said ring.

2. In a regeneratively cooled chamber having an encompassing sidewall formed by brazing coolant conducting tubes together to form tube bundles, the improvement comprising:
   an annular, hollow ring having flexible wall means for forming an annular chamber for joining a pair of said tube bundles together in fluid communication with each other through said annular chamber, said flexible wall means permitting thermal flexure of said tubes of each tube bundle with a minimum of stress and providing a counter moment under its own coolant pressure to minimize chamber pressure stresses on said tubes.

3. In a regeneratively cooled structure of the type having coolant tubes forming an encompassing sidewall having an inlet section of a first diameter, a throat section of a second diameter and an outlet section of a third diameter, the improvement comprising:
   a plurality of modular tube bundles forming said inlet, throat and outlet sections, each of said tube bundles including a plurality of tubes rigidly connected together in side-by-side relation to form said encompassing sidewall;

hoop means connecting said modular tube bundles together in fluid communication with each other, said hoop means including an annular channel in fluid communication with said tube bundles; and a coolant inlet manifold connected to said structure in fluid communication with said tubes for introducing a coolant thereto.

4. A thrust chamber comprising:

a plurality of chamber sections positioned along the length of said chamber;

each of said sections comprising a plurality of individual tubes placed adjacent one another along their length and shaped to form the desired wall surface for the section;

means for rigidly securing said individual tubes together along their length after being shaped in order for the tubes to provide a fluid tight section; and means for joining said shaped sections end to end to form a fluid tight encompassing wall for said chamber and provide for coolant fluid flow from section to section.

5. A thrust chamber as defined in claim 4 wherein at least two adjacent sections of said chamber have different shaped wall surfaces except at the point of end to end joining.

6. A thrust chamber as defined in claim 4 wherein the individual tubes of at least one section have the same shape, the ends of the tubes of said section being formed into identical square sections to form flat inner and outer end surfaces for the section when the ends are placed side by side.

7. A thrust chamber as defined in claim 4 wherein the individual tubes of one section have different cross sectional area than the individual tubes of an adjacent section.

8. A thrust chamber as defined in claim 4 wherein said joining means comprises an annular ring secured to the outside surface of adjacent ends of adjoining sections and extending outwardly from said tubes to form an annular chamber in fluid communication with the tube ends of adjacent sections, and an inner shell located opposite said ring and secured between the inner surfaces of the tube ends of adjacent sections to close the space between said adjacent ends opposite said chamber.

9. A thrust chamber as defined in claim 8 wherein the ends of said individual tubes of each section are formed into identical square sections to provide flat inner and outer end surfaces for each section when the ends are placed side by side, said ring having a first lip secured to the square tube ends of one section and a second lip secured to the square tube ends of the adjacent section.

10. A thrust chamber as defined in claim 9 wherein the square ends of adjacent sections are of different size so that one lip is larger than the other in cross section, said ring and shell being somewhat flexible to permit movement of said section under thermal stresses.

References Cited by the Examiner

UNITED STATES PATENTS

| | | | |
|---|---|---|---|
| 868,942 | 10/1907 | Reid | 285—137 X |
| 2,607,370 | 8/1952 | Anderson | 138—90 |
| 2,692,763 | 10/1954 | Helm | 165—154 |
| 2,793,008 | 5/1957 | Donegan | 165—154 |
| 3,035,333 | 5/1962 | Baehr | 29—157.3 |
| 3,062,566 | 11/1962 | Coburn | 285—189 X |
| 3,069,850 | 12/1962 | Ledwith et al. | 60—39.66 X |
| 3,083,447 | 4/1963 | Andersen et al. | 29—157.3 |
| 3,116,603 | 1/1964 | Hausmann | 60—35.6 X |

MARK NEWMAN, *Primary Examiner.*

CHARLES SUPALO, SAMUEL LEVINE, *Examiners.*

S. W. MILLARD, D. HART, *Assistant Examiners.*